Figure 1:
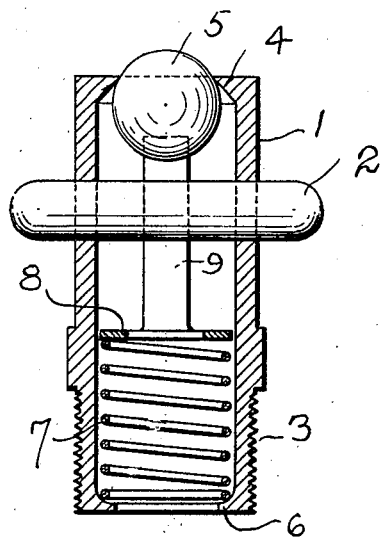

April 5, 1927.

G. W. DE LOACHE 1,623,097

FITTING FOR QUICK DETACHABLE COUPLINGS

Filed Aug. 9, 1926

Inventor

George W. De Loache
By F. L. Walker
Attorney

Patented Apr. 5, 1927.

1,623,097

UNITED STATES PATENT OFFICE.

GEORGE W. DE LOACHE, OF DAYTON, OHIO, ASSIGNOR TO THE LARKIN AUTOMOTIVE PARTS COMPANY, OF DAYTON, OHIO, A CORPORATION OF OHIO.

FITTING FOR QUICK-DETACHABLE COUPLINGS.

Application filed August 9, 1926. Serial No. 128,164.

My invention relates to valved couplings and more particularly to a nipple or fitting to receive lubricant or the like from a detachable compressor or grease gun or other filling device.

While the invention is herein described as a lubricant receiver it will be understood that it is not limited to such usage but may be utilized as receptacle for other commodities, and the device may be employed as a valved coupling for general purposes.

At the present time nipples or receivers are quite commonly employed, embodying a spring pressed closure and having a transverse pin projecting from the opposite sides of the nipple or receiver which adapt such element for use as one member of a bayonet slot coupling. Such nipples or receivers are ordinarily employed in conjunction with a compressor or filling device having a complementary nozzle provided with a bayonet slot for engagement with the protruding ends of the pin carried by the nipple.

In such construction it has been customary to interpose the spring for the closure member between such closure and the transverse pin, resting the spring either directly upon the pin or upon an internal shoulder adjacent to the pin. Such construction will accommodate a spring having but a very few turns and hence the movement of the closure member is quite limited. Moreover, in such construction the grease or other commodity after passing the closure valve must pass intermediate the turns of the actuating spring to the interior thereof in order to pass into the body of the nipple or receiver. It is found in some instances that when the lubricant or other commodity is injected under high pressure or the pressure is suddenly applied the opening movement of the closure valve compresses the actuating spring to such extent that its turns or convolutions contact each other and so either entirely block the entrance of the lubricant or greatly retard its flow.

To overcome the objectionable features of such valved "pin fittings" or coupling elements, the present construction embodies an actuating spring located in the body of the nipple or receiver wholly below the transverse coupling pin and the closure member at the entrance to the nipple or receiver is supported on arms or furcations extending on opposite sides of the intermediate portion of the pin and engaging with the spring therebeyond. The elongated furcations of the spacer member affords an increased range of movement for such closure and enables the passage of the lubricant to the interior of the spring without the necessity of passing between the turns or convolutions of the spring which are varied in their relation under compression.

The object of invention is to simplify the construction as well as the means and the mode of operation of such valved couplings or receivers whereby they will not only be cheapened in construction but will be more efficiently used positive and sure in its operation uniform in the admission of lubricant or other commodity at various pressures and unlikely to get out of repair.

A further object of invention is to provide an improved form of closure valve for such pin coupler having an increased range of opening movement and to provide means for utilizing a spring of increased length for actuating the closure.

With the above primary and other incidental objects in view as will more fully appear in the specification the invention consists of the features of construction the parts and combinations thereof and the mode of operation or their equivalents as hereinafter described as set forth in the claims.

Figure 2:
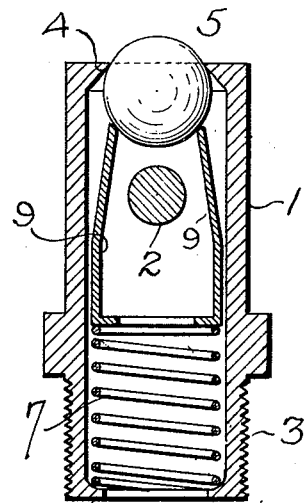
Figure 4:
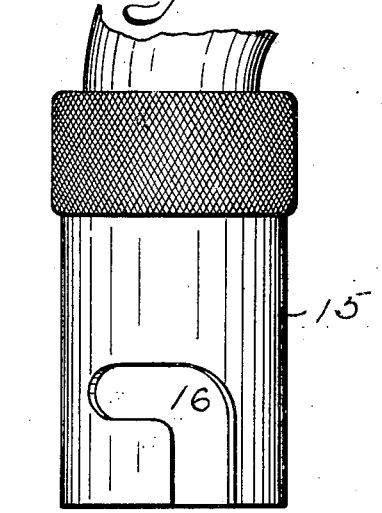
Figure 4:
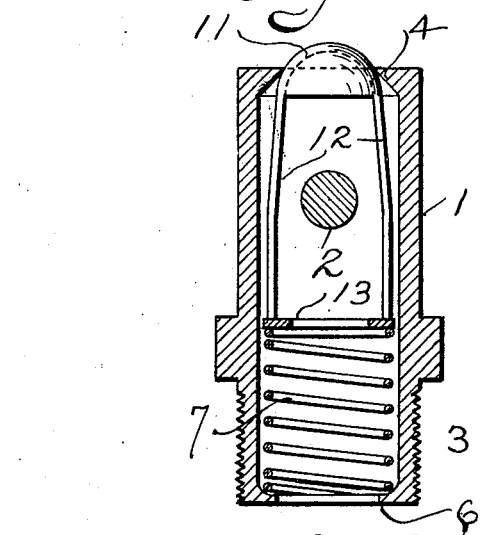
Figure 3:
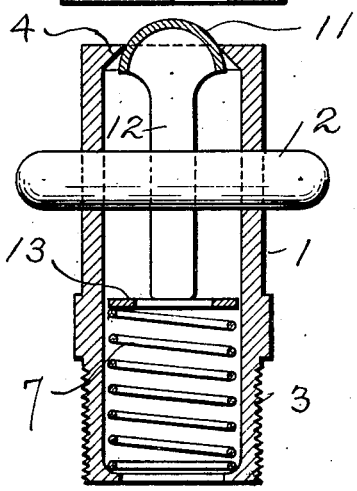
Figure 5:
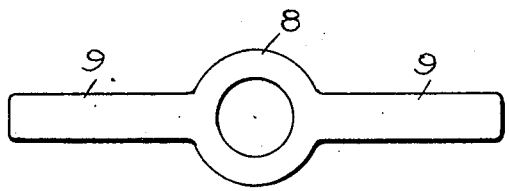

Referring to accompanying drawings wherein is shown the preferred but obviously not necessarily the only form of embodiment of invention Fig. 1 is a vertical sectional view of an assembled valved coupling element forming the subject matter hereof. Fig. 2 is a vertical sectional view in a plane at right angle to that of Fig. 1. Fig. 3 is a vertical sectional view of a modification of the construction shown in Figs. 1 and 2 and associated therewith is shown a slotted nozzle of the assembled nipple or receiver shown in Fig. 3 the view being in a plane at right angle to that of Fig. 3. Fig. 4 is an elevational view, partly in section, of a slightly modified form of the device. Fig. 5 is a detailed plan view of the blank from which the bifurcated spacer member shown in Figs. 1 and 2 is formed.

Like parts are indicated by similar characters of reference throughout the several views.

Referring to the accompanying drawings 1 is the nipple or receiver through which extends a transverse coupling pin 2 the ends of which protrude outwardly from the opposite sides of the nipple or receiver 1. The nipple 1 is shown screw threaded at 3 for engagement with a bearing to be lubricated or other receptacle to be filled. At its opposite end the nipple or receiver 1 is inwardly flanged at 4 to afford a seat for a closure valve 5. This closure is shown as a ball valve although other forms of valve may be substituted.

Located in the lower portion of the nipple or receiver 1 and abutting upon an inturned flange 6 thereof is a helical spring 7. Interposed between the actuating spring 7 and the closure ball 5 is a bifurcated spacer member comprising a perforated head portion 8 resting upon the spring 7 and upstanding spaced arms 9 which extend on opposite sides of the transverse pin 2 and engage the ball valve 5 to hold the valve against its seat 4 under the influence of the spring 7. Upon the depression of the ball 5 from its seat 4, to admit lubricant or other commodity, such admitted material passes readily around the ball valve and then between the arms 9 and through the central perforation in the head 8 of the spacer. The proportion and relation of the parts is such that little or no resistance is afforded to the movement of the lubricant through the nipple or receiver. This capacity for passing lubricant easily is unaffected by the degree of compression of the spring 7 or the extent to which the ball valve is unseated, as is the case when the spring is interposed between the ball and transverse pin. At the same time the ball is capable of a somewhat greater range of opening movement than when the spring is so interposed between the ball and pin.

In Figs. 3 and 4 there is shown a modification where in lieu of the ball valve 5 the closure member 11 comprises a semi-spherical hollow head stamped from sheet metal from which projects downwardly on opposite sides of the transverse pin 2, spaced legs 12. At their lower ends the legs 12 bear upon a perforated disc collar 13 resting on top of the spring 7. The operation and function of the parts are the same as before described. The closure head 11 is depressible away from its seat 4 against the tension of the spring to which its movement is transmitted by the dependant legs 12 bearing upon the thrust collar 13. Lubricant or other commodity passing the closure head 11 is afforded a free passage intermediate the legs 12 and past the transverse pin 2 and thence through the central opening in the thrust collar 13 and helical spring 7 to the outlet at the lower end of the nipple or receiver 1. The closure 11 is capable of considerable range of movement against the yielding resistance of the spring 7 without interference with the pin 2. Such movement, however, in no way interfering with or varying the capacity of the nipple to pass the admitted lubricant.

There is shown at 15 in Fig. 3 the complementary coupling member having therein the bayonet slot 16 for engagement with the protruding ends of the transverse 2.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

1. In a valved coupling element of the character described, a tubular member, a valve seat formed at one end thereof, a transverse coupling pin extending through said tubular member and protruding on opposite sides thereof, a closure member located at one side of said pin for engagement with the valve seat, an actuating spring located within the tubular member on the opposite side of the transverse pin, and spacer means intermediate the closure member and spring and extending past the pin to transmit the pressure and movement of one of said members to the other.

2. In a valved coupling member for a bayonet slot connection or the like, a tubular member, a valve seat formed therein, a closure member for engagement with the valve seat, an actuating spring located in said tubular member, a transverse coupling pin extending through the tubular member intermediate the closure and spring and protruding from opposite sides thereof, and intermediate spacer means extending on opposite sides of the pin and operatively connecting the closure and spring wholly independent of said pin.

3. In a valved coupling member for a bayonet connection or the like, a tubular member, a valve seat formed therein, a closure engageable with said valve seat, a spring located within the tubular member, a transverse coupling pin extending through the tubular member intermediate the spring and closure, and intermediate motion transmitting means interconnecting the closure and spring independent of said pin.

4. In a valved coupling member for a bayonet connection or the like, a tubular member, a valve seat formed therein, a closure engageable with said valve seat, a spring located within the tubular member, a transverse coupling pin extending through the tubular member intermediate the spring and closure, and a bifurcated member within the tubular member straddling the transverse pin and engaging the closure member at one end and the spring at its other end to transmit motion from one to the other past said pin.

5. In a valved nipple or the like, a tubular member, a valve seat formed therein a closure engageable with the valve seat a helical spring for urging the closure toward its valve seat, and means for maintaining an open passage beyond the closure to the interior of the spring independent of the passages intermediate successive turns of the spring for the passage of a commodity entering the tubular member.

In testimony whereof, I have hereunto set my hand this 5th day of August, A. D. 1926.

GEORGE W. DE LOACHE.